(12) United States Patent
Park

(10) Patent No.: US 8,525,948 B2
(45) Date of Patent: Sep. 3, 2013

(54) LIQUID CRYSTAL DISPLAY MODULE HAVING A SEMI-SPHERICAL SHAPE PROTRUSION FORMED IN A LIGHT GUIDE DISPOSED WITHIN A SEMI-SPHERICAL SHAPE HOLE FORMED WITHIN A SUPPORT MAIN

(75) Inventor: Jae Woo Park, Kuml-shi (KR)

(73) Assignee: LG Display Co., Ltd., Seoul (KR)

( * ) Notice: Subject to any disclaimer, the term of this patent is extended or adjusted under 35 U.S.C. 154(b) by 22 days.

(21) Appl. No.: 13/396,387

(22) Filed: Feb. 14, 2012

(65) Prior Publication Data

US 2012/0140140 A1 Jun. 7, 2012

Related U.S. Application Data

(60) Continuation of application No. 12/656,242, filed on Jan. 21, 2010, now Pat. No. 8,130,337, which is a division of application No. 11/580,912, filed on Oct. 16, 2006, now Pat. No. 7,671,933, which is a division of application No. 10/745,705, filed on Dec. 29, 2003, now Pat. No. 7,139,047.

(30) Foreign Application Priority Data

Jun. 19, 2003 (KR) .................................. 2003-39639

(51) Int. Cl.
*G02F 1/1333* (2006.01)
*G02F 1/1335* (2006.01)

(52) U.S. Cl.
USPC ............. 349/58; 349/62; 349/65; 345/905; 361/681; 361/714; 361/752

(58) Field of Classification Search
USPC .................... 349/58–65; 361/681, 714, 752; 345/905
See application file for complete search history.

(56) References Cited

U.S. PATENT DOCUMENTS

| | | | |
|---|---|---|---|
| 3,353,644 A | 11/1967 | Howard et al. | |
| 6,828,721 B2 | 12/2004 | Wakita | |
| 6,836,303 B2 | 12/2004 | Kim | |
| 2001/0050731 A1 | 12/2001 | An et al. | |
| 2002/0024623 A1 | 2/2002 | Kim et al. | |
| 2003/0122995 A1* | 7/2003 | Park et al. | 349/58 |
| 2003/0128307 A1* | 7/2003 | Ito et al. | 349/58 |
| 2003/0223020 A1 | 12/2003 | Lee | |
| 2005/0183824 A1 | 8/2005 | Lee et al. | |
| 2011/0194049 A1* | 8/2011 | Kim et al. | 349/64 |

FOREIGN PATENT DOCUMENTS

| | | |
|---|---|---|
| KR | 10-2002-0031895 | 5/2002 |
| KR | 10-2002-0052967 | 7/2002 |
| KR | 10-2002-0070116 | 9/2002 |

* cited by examiner

*Primary Examiner* — Huyen Ngo

(74) *Attorney, Agent, or Firm* — McKenna Long & Aldridge, LLP

(57) ABSTRACT

A liquid crystal display module for preventing noise caused by friction between a support main and a light guide plate is provided. In the module, a hole is defined at a support main having at least one of a polygonal shape or a circular shape. A light guide plate is disposed on the support main. A protrusion which protrudes from a side surface of the light guide plate is inserted into the hole. The protrusion has at least one of said polygonal shapes and said circular shape.

7 Claims, 15 Drawing Sheets

LIQUID CRYSTAL DISPLAY MODULE HAVING A SEMI-SPHERICAL SHAPE PROTRUSION FORMED IN A LIGHT GUIDE DISPOSED WITHIN A SEMI-SPHERICAL SHAPE HOLE FORMED WITHIN A SUPPORT MAIN

CROSS-REFERENCE TO RELATED APPLICATIONS

This application is a Continuation of application Ser. No. 12/656,242 filed Jan. 21, 2010, now U.S. Pat. No. 8,130,337, which is a divisional of application Ser. No. 11/580,912 filed Oct. 16, 2006, now U.S. Pat. No. 7,671,933, which is a divisional application of U.S. patent application Ser. No. 10/745,705 filed Dec. 29, 2003, now U.S. Pat. No. 7,139,047, which claims priority to Korean Patent Application No. 2003-39639, filed Jun. 19, 2003, each of which is incorporated by reference for all purposes as if fully set forth herein.

BACKGROUND OF THE INVENTION

1. Field of the Invention

This invention relates to a liquid crystal display module, and more particularly to a liquid crystal display module that prevents physical noise caused by friction between a support main and a light guide plate.

2. Description of the Related Art

Generally, a liquid crystal display (LCD) includes a liquid crystal display module, driving circuitry for driving the liquid crystal display module, and a case.

The liquid crystal display module consists of a liquid crystal display panel having liquid crystal cells arranged in a matrix between two glass substrates, and a backlight unit which irradiates light onto the liquid crystal display panel. The liquid crystal display module is arranged with optical sheets which vertically raise light traveling from the backlight unit toward the liquid crystal display panel.

However, the aforementioned liquid crystal display panel, backlight unit and optical sheets must engage with each other in an integral shape to prevent light loss and have protection from a damage caused by an external impact. Thus, a case for the LCD enclosing the back light unit and the optical sheets including the edge of the liquid crystal display panel is provided. The above-mentioned LCD is mounted in a portable information processing device such as a notebook personal computer to thereby be used as a display device.

Referring to FIG. 1 and FIG. 2, a related art liquid crystal display module includes a support main 14, a backlight unit and a liquid crystal display panel 6 disposed at an inside of the support main 14, and a case top 2 for securing the liquid crystal display panel 6 and the support main 14.

The liquid crystal display panel 6 comprises an upper glass substrate 6a and a lower glass substrate 6b. Liquid crystal cells are arranged in an active matrix type between the upper glass substrate 6a and the lower glass substrate 6b, and are provided with thin film transistors which switch video signals. The liquid crystal display panel 6 changes a refractive index of each liquid crystal cell in accordance with video signals thereby displaying a picture corresponding to the video signals. An upper polarizing sheet 4a is attached to an upper side of the upper glass substrate 6a while a lower polarizing sheet 4b is attached to a rear side of the lower glass substrate 6b.

A tape carrier package (not shown) mounted with a driver integrated circuit that applies a driving signal to the thin film transistor is attached to the lower substrate 6b of the liquid crystal display panel 6.

The support main 14 is molded and an inner side wall surface thereof is molded into a step coverage face. The step coverage face of the support main 14 is mounted with a back light unit and the liquid crystal display panel 6 is disposed thereon.

The backlight unit includes a lamp 21, a lamp housing 23, a reflective sheet 12, a light guide plate 10 and optical sheets 8.

The lamp 21 includes a cold cathode fluorescent lamp. A light generated from the lamp 21 is incident, via an incidence face at the side of the light guide plate 10, to the light guide plate 10.

The lamp housing 23 has a reflective face at its inner side which reflects light from the lamp 21 into the incidence face of the light guide plate 10.

The reflective sheet 12 is positioned at a rear side of the light guide plate 10 to re-reflect an incident light, via the rear side of the light guide plate 10, to the light guide plate 10, thereby reducing light loss.

An incidence face of light guide plate 10 engages with the lamp housing 23, and a second portion of the light guide plate 10 secures to the support main 14. The light guide plate 10 converts a line light input from the lamp 21 into a plane light thereby guiding the light into the liquid crystal display panel 6. Simultaneously, the reflective sheet 12 reflects light traveling into the lower side of the light guide plate 10 toward the liquid crystal display panel 6. A light output from the light guide plate 10 with the lamp 21 is incident, via a plurality of optical sheets 8, to the liquid crystal display panel 6.

The optical sheets 8 allow light input from the light guide plate 10 to travel vertically into the liquid crystal display panel 6. To further illustrate, the optical sheets 8 change a light path perpendicularly to the liquid crystal display panel 6. The optical sheets 8 comprise first and second prism sheets between first and second diffusing sheets.

The case top 2 has a square band shape including a plane part bent perpendicularly and a side part bent perpendicularly. The top case 2 encloses an edge of the liquid crystal display panel 6 and the support main 14.

Upon assembling the liquid crystal display module, the support main 14 and the light guide plate 10 are provided with a plurality of engaging parts 50 for engagement between the support main 14 and the light guide plate 10 as shown in FIG. 3.

More specifically, each engaging part 50 comprises a square hole 20 at a side of the support main 14, and a protrusion 25 protruding from a side of the light guide plate 10. The protrusion 25 at the light guide plate 10 protrudes, by a desired length, from each side surface and a lower surface of the light guide plate 10 as shown in FIG. 4. Each square hole at the support main 14 is formed a certain size at a portion corresponding to the protrusion 25 provided at the light guide plate 10 as shown in FIG. 4 such that the protrusion 25 can be inserted into each square hole.

As described above, in a related art liquid crystal display module, the protrusion 25 of the light guide plate 10 is inserted into the square hole 20 of the support main 14 thereby securing the light guide plate 10 to the support main 14. As shown in FIG. 5, each corner of the light guide plate 10 is opposed to each corner 30 of the square hole 20 of the support main 14 in a diagonal direction. The support main 14 is formed from a relatively lightweight mold product which reduces a weight of the liquid crystal display module. Thus, if an external force is applied to one side of the related art liquid crystal display module, twist occurs at the liquid crystal display module. In addition, the support main 14 twists into one side thereof by an external force applied to one side of the support main 14 as shown in FIG. 6. Accordingly, friction occurs between the square hole 20 of the twisted support main 14 and the light guide plate 10, thereby causing noise. More specifically, when the support main 14 twists, a lower surface of the square hole 20 contacts a corner portion 38 of an upper side of the light guide plate 10. The friction generates noise at the corner portion 38 where the support main 14 contacts the light guide plate 10.

Furthermore, in a related art liquid crystal display module, friction between the square hole 20 of the support main 14 and the protrusion 25 of the light guide plate 25 caused by twisting of the support main 14 generates an alien substance. If the alien substance lodges between the light guide plate 10 and the optical sheets 8, light passing through the light guide plate 10 may shut off thereby causing a black spot at a position of the liquid crystal display panel 6 corresponding to the alien substance.

SUMMARY OF THE INVENTION

Accordingly, the present invention is directed to liquid crystal display module that substantially obviates one or more of the problems due to limitations and disadvantages of the related art.

Accordingly, it is an advantage of the present invention to provide a liquid crystal display module that prevents friction between the support main and the light guide plate. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the present invention includes a support main; a hole defined at the support main having at least one of polygonal shapes and a circular shape; a light guide plate disposed on the support main; and a protrusion protruding from the side surface of the light guide plate for insertion into the hole, said protrusion being formed to have at least one of said polygonal shapes and said circular shape.

In the liquid crystal module, the corner of the protrusion may be inclined.

Alternatively, the corner of the protrusion may be formed to have a circular shape.

Herein, the shortest distance between the protrusion and the hole is substantially equal to the height of the protrusion.

The center of the hole has a stepped portion.

Alternatively, the center of the hole is formed to have a circular shape.

Otherwise, the corner of the hole is formed to have a circular shape, and the corner of the protrusion is formed to have a circular shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
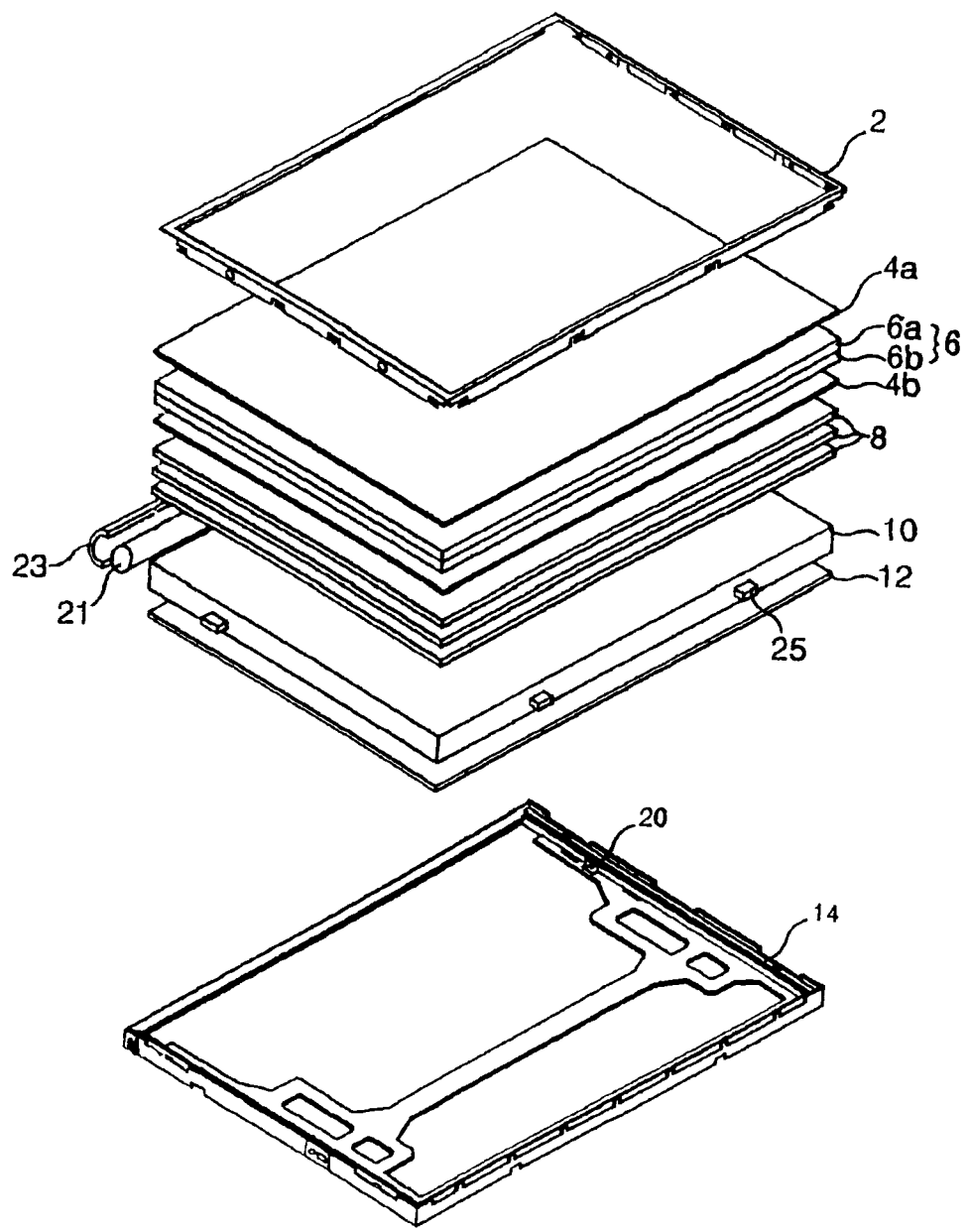
FIG. 1 is an exploded perspective view showing a structure of a related art liquid crystal display module.
Figure 2:
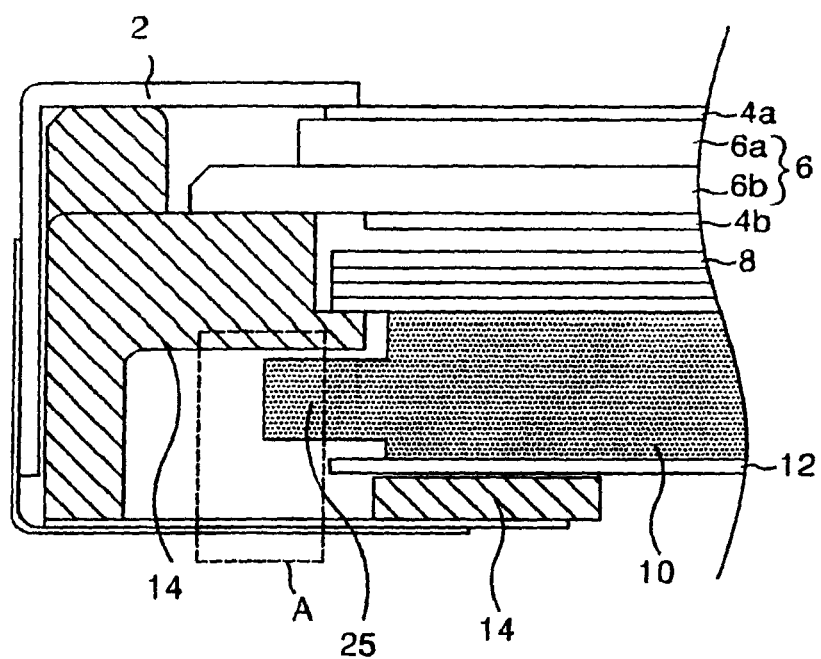
FIG. 2 is a cut-away section view of one side of the liquid crystal display module shown in FIG. 1.
Figure 3:
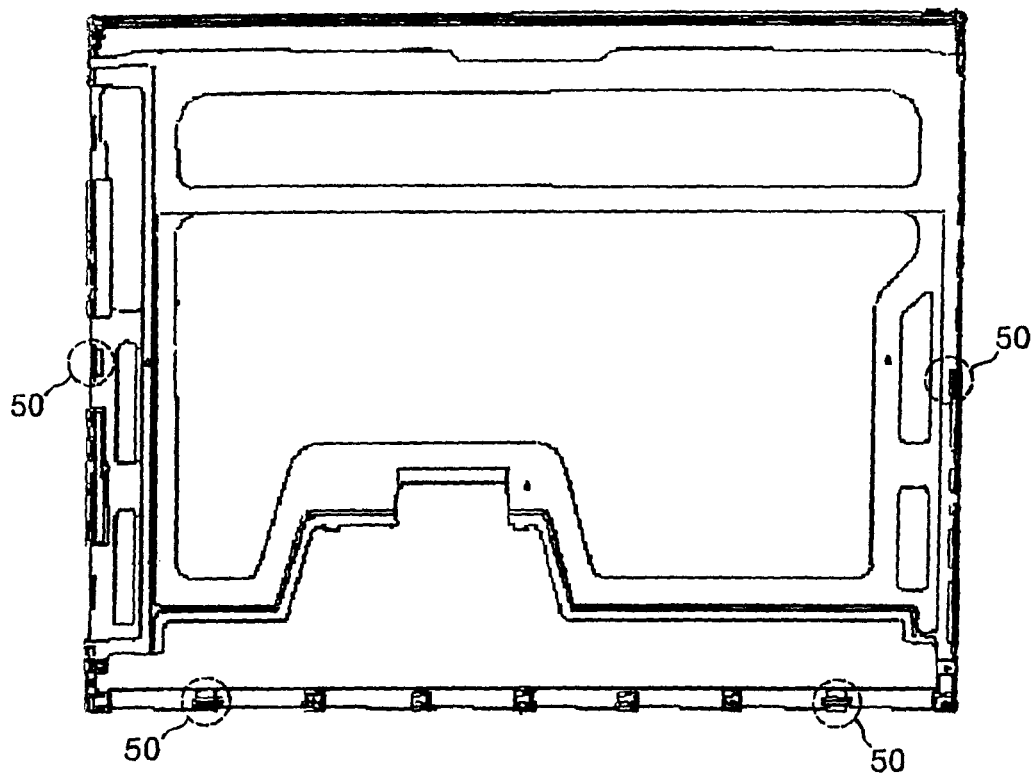
FIG. 3 illustrates engaging parts for securing a light guide plate to a support main of the liquid crystal display module shown in FIG. 1.
Figure 4:
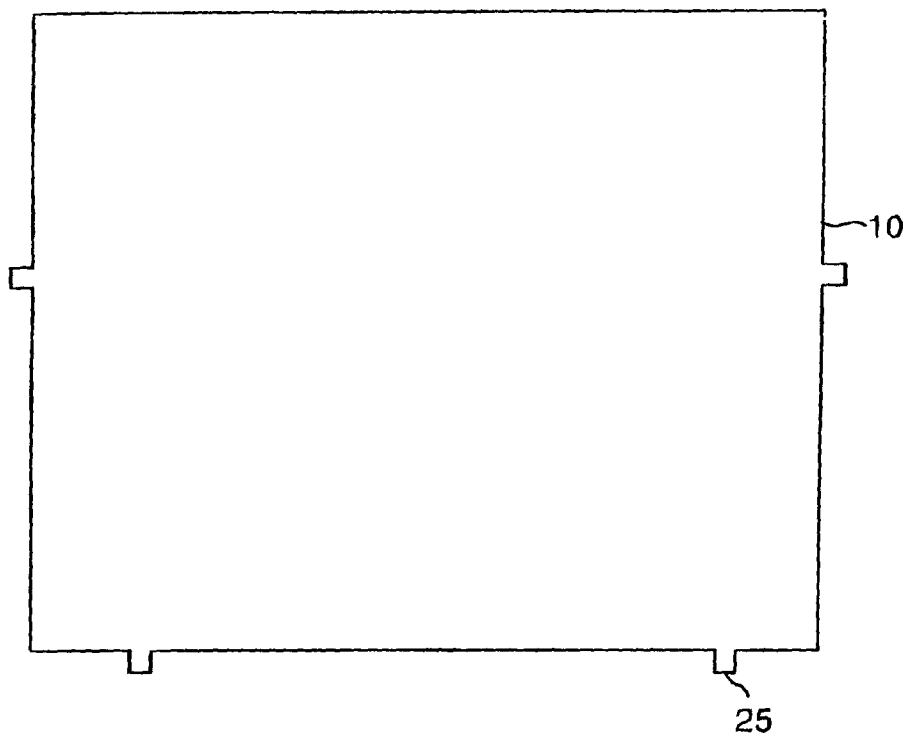
FIG. 4 is a plan view of a light guide plate shown in FIG. 2.
Figure 5:
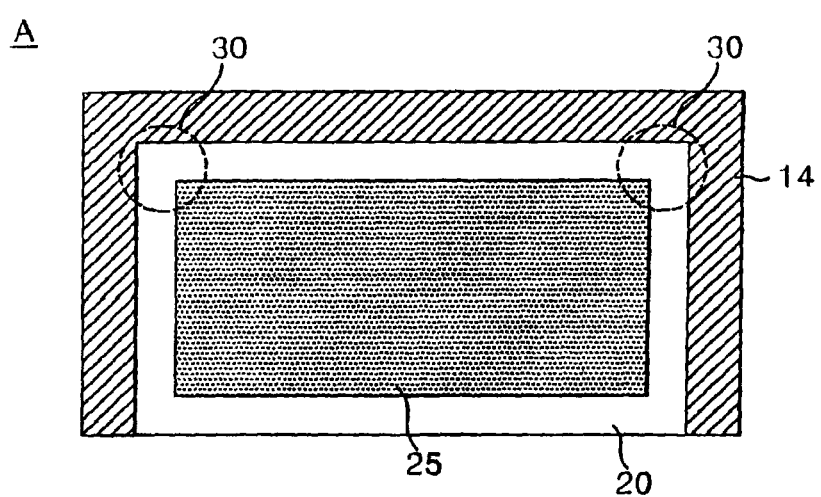
FIG. 5 illustrates an A portion at which the support main shown in FIG. 1 is engaged with the light guide plate.
Figure 6:
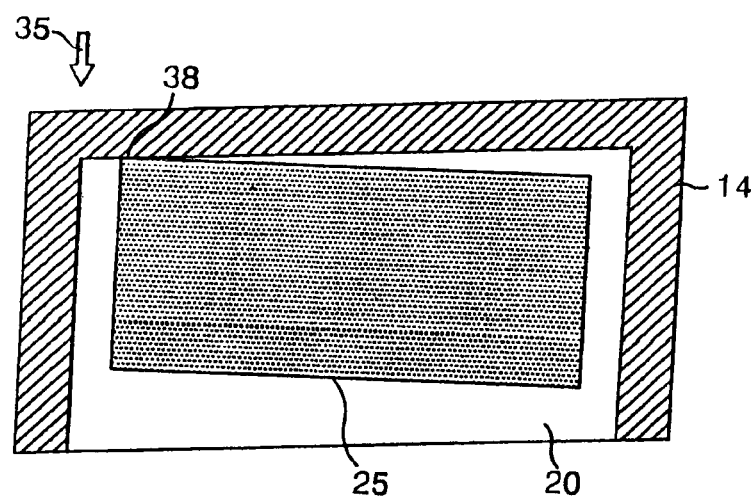
FIG. 6 is a sectional view showing twist of the support main shown in FIG. 1.
Figure 7:
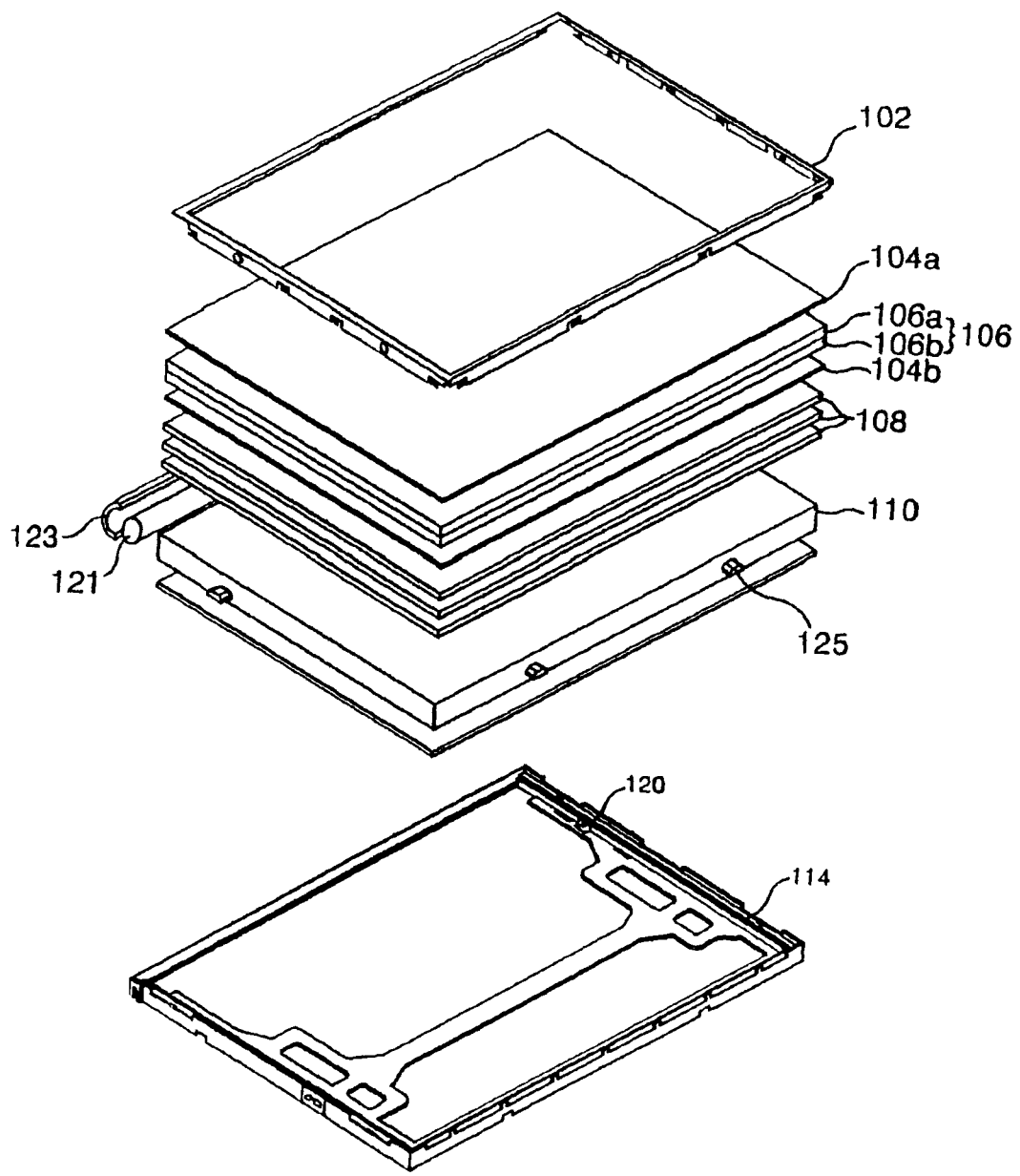
FIG. 7 is an exploded perspective view showing a structure of a liquid crystal display module according to a first embodiment of the present invention.
Figure 8:
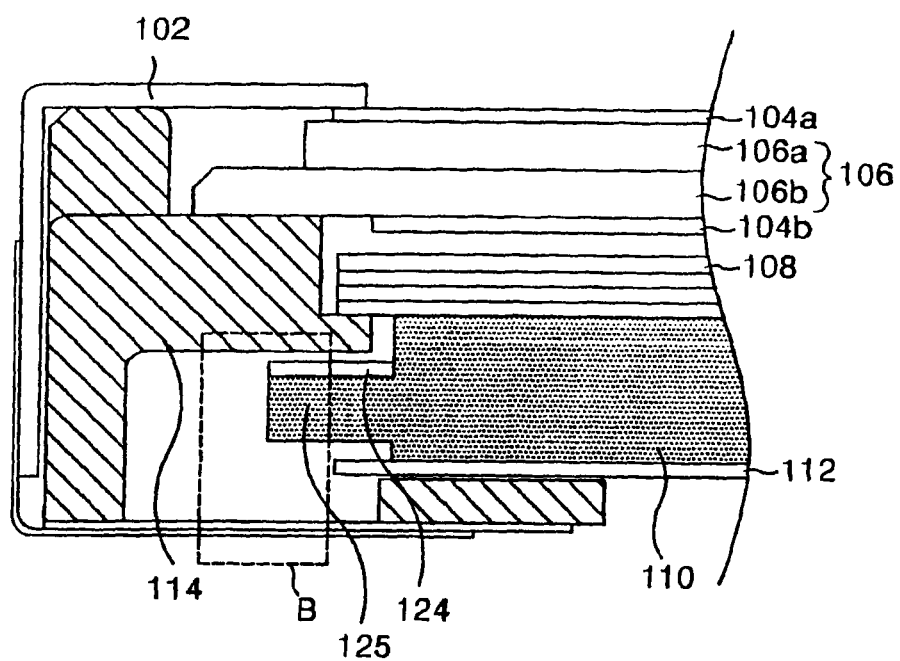
FIG. 8 is a cut-away section view of one side of the liquid crystal display module shown in FIG. 7.

Referring to FIG. 7 and FIG. 8, a liquid crystal display module according to a first embodiment of the present invention includes a support main 114, a backlight unit and a liquid crystal display panel 106 disposed at an inside of the support main 114, and a case top 102 for securing the liquid crystal display panel 106 and the support main 114.

The liquid crystal display panel 106 comprises an upper glass substrate 106a and a lower glass substrate 106b. Liquid crystal cells are arranged in an active matrix between the upper glass substrate 106a and the lower glass substrate 106b, and include thin film transistors which switch video signals. The liquid crystal display panel 106 changes a refractive index of each liquid crystal cell in accordance with video signals thereby displaying a picture corresponding to the video signals. An upper polarizing sheet 104a is attached to an upper side of the upper glass substrate 106a while a lower polarizing sheet 104b is attached to a rear side of the lower glass substrate 106b.

A tape carrier package (not shown) mounted with a driver integrated circuit, which applies a driving signal to the thin film transistor, is attached to the lower substrate 106b of the liquid crystal display panel 106.

The support main 114 is molded, and an inner side wall surface thereof is molded into a step coverage face. An inner side of the support main 114 is mounted with a backlight unit, and the liquid crystal display panel 106 is disposed thereon. Further, a side surface of the support main 114 includes a plurality of holes 120 which secure the light guide plate 110. Each hole 120 is formed by removing a portion of a side frame of the support main 114 in a rectangular shape. Furthermore, in accordance with an embodiment of the present invention, a cross-sectional configuration of the hole 120 is a parallelogram.

The backlight unit includes a lamp 121, a lamp housing 123, a reflective sheet 112, a light guide plate 110 and optical sheets 108.

The lamp 21 includes a cold cathode fluorescent lamp. A light generated from the lamp 121 is incident, via an incidence face in a side of the light guide plate 110, to the light guide plate 110.

The lamp housing 123 has a reflective face at its inner side which reflects light from the lamp 121 to the incidence face of the light guide plate 110.

The reflective sheet 112 is positioned at a rear side of the light guide plate 110 to re-reflect an incident light, via the rear side of the light guide plate 110, to the light guide plate 10, thereby reducing light loss.

The incidence face of light guide plate 110 engages with the lamp housing 123, and another portion of the incidence face secures to the support main 114. The light guide plate 110 converts line light input from the lamp 121 into plane light thereby guiding the light to the liquid crystal display panel 106. Simultaneously, the reflective sheet 112 reflects light traveling into a lower side of the light guide plate 110 toward the liquid crystal display panel 106. A light output, via the light guide plate 110 from the lamp 121 is incident, via a plurality of optical sheets 108, to the liquid crystal display panel 106.

Figure 9:
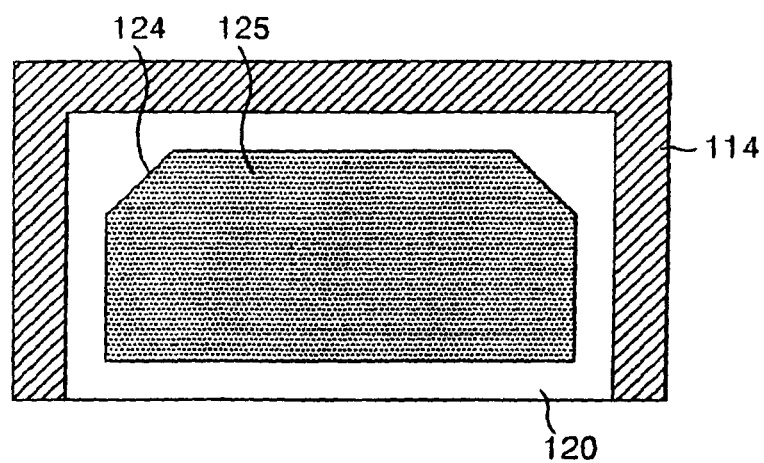
FIG. 9 illustrates an engaging part B of a support main shown in FIG. 8 with a light guide plate.

Further, the light guide plate 110 includes a plurality of protrusions 125 inserted into a plurality of holes 120 provided at a side surface of the support main 114. The plurality of protrusions 125 engage with the holes 120. Each protrusion 125 extends a length from the side surface of the light guide plate 110. Furthermore, a corner portion at an upper side of the protrusion 125 has an incline plane 124. The incline plane 124 includes a desired slope, as shown in FIG. 9. Moreover, the protrusion 125 has a tetrahedron shape, as shown in FIG. 9. The incline plane 124 prevents friction with the lower surface of the hole 120 of the support main 114.

The optical sheets 108 allow vertical progression of light input from the light guide plate 110 to the liquid crystal display panel 106. Thus, the optical sheets 108 change a light path perpendicularly to the liquid crystal display panel 106. The optical sheets 108 comprise first and second prism sheets disposed between first and second diffusing sheets.

The case top 102 has a square band shape including a plane part perpendicularly bent and a side part perpendicularly bent. The top case 102 encloses an edge of the liquid crystal display panel 106 and the support main 114.

Figure 10:
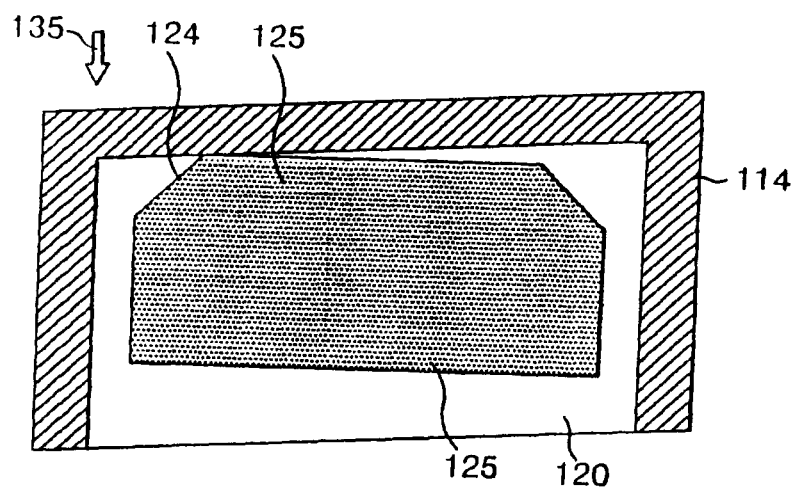
FIG. 10 is a sectional view showing twisting of the support main shown in FIG. 7.

As described above, in the first embodiment of the present invention, the protrusion 125 of the light guide plate 110 is inserted into the hole 120 of the support main 114 thereby securing the light guide plate 110 to the support main 114. In the liquid crystal display module of the first embodiment, the support main 114 is formed from a relatively lightweight mold product, which reduces the weight of the liquid crystal display module. If an external force is applied to one side of the liquid crystal display module, twist may occur at the liquid crystal display module, as illustrated in FIG. 10. The twisting of the liquid crystal display module causes twisting of the support main 114 into one side by an external force 135 applied to one side of the support main 114. When the support main 114 twists, the incline plane 124 of the protrusion 125 of the light guide plate 110 minimizes friction between the hole 120 of the support main 114, which twists from the external force 135 and the protrusion 125 of the light guide plate 110.

More specifically, when the external force 135 shakes or twists the support main 114, a lower surface of the hole 120 slides by the incline plane 124 of the protrusion 125. As such, the incline plane 124 of the protrusion 125 slidably guides the lower surface of the hole 120 of the support main 114, thereby preventing noise caused by friction between the hole 120 of the support main 114 and the protrusion 125 of the light guide plate 110.

In accordance with this embodiment of the present invention, each corner of the upper side of the protrusion 125 has the incline plane 124. The incline plane 124 reduces friction between the hole 120 of the support main 114 and the protrusion 125 of the light guide plate 110, thereby minimizing noise. Furthermore, the liquid crystal display module according to the first embodiment of the present invention prevents the generation of alien substances caused by friction between the hole 120 of the support main 114 and the protrusion 125 of the light guide plate 110. As such, this embodiment of the present invention prevents picture quality deterioration of the liquid crystal display panel 106 from alien substances.

Figure 11:
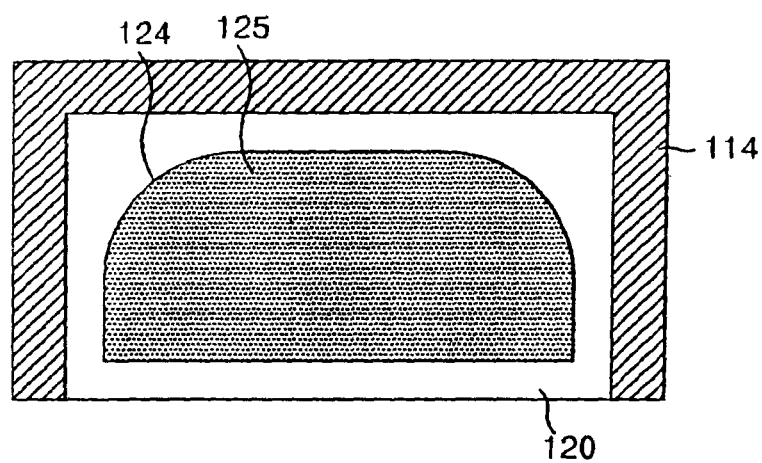
FIG. 11 is a sectional view showing an engaging part of a support main with a light guide plate in a liquid crystal display module according to a second embodiment.
Figure 12:
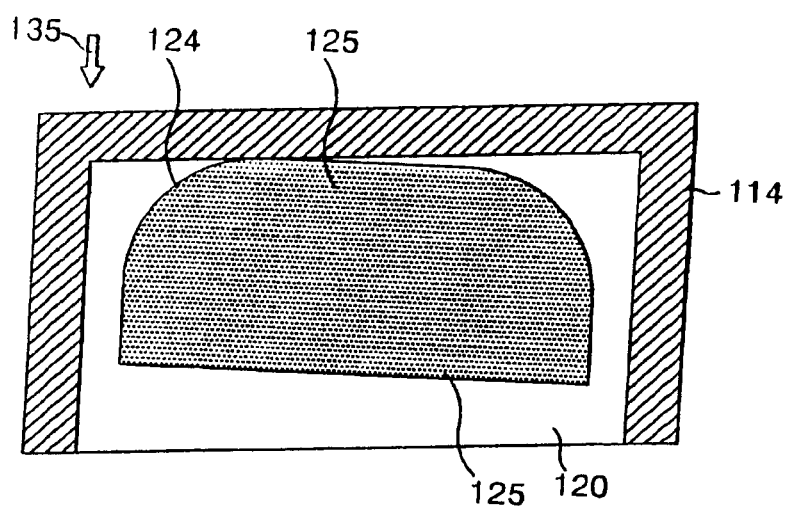
FIG. 12 is a sectional view showing twisting of the support main shown in FIG. 11.

Referring to FIG. 11, a liquid crystal display module according to a second embodiment of the present invention includes elements similar to those described with reference to the first embodiment of the present invention except for the protrusion 125 provided at the light guide plate 110. Thus, reference may be made to the first embodiment regarding elements in the second embodiment similar to those described with regards to the first embodiment. Moreover, discussion regarding the second embodiment of the present invention will include the protrusion 125 at the light guide plate 110.

The protrusion 125 at the light guide plate 110 of the liquid crystal display module according to the second embodiment of the present invention protrudes in a square shape at a desired length. Furthermore, each corner of an upper side opposed to the liquid crystal display panel has a curved face 124. Thus, in the liquid crystal display module according to the second embodiment, the curved face 124 provides a space between each corner of the hole 120 and each corner of the protrusion 125 of the light guide plate 110. The space between the corners of the hole 120 and the corners of the protrusion 125 prevents friction between the hole 120 and the protrusion 125. In this embodiment, as a radius of the curve face 124 of the protrusion increases, noise caused by friction with the support main 114 reduces. Herein, in an embodiment where a thickness of the protrusion 125 is in a range between about 0.6 mm and about 1.3 mm, a radius of the curved face 124 may equal the thickness of the protrusion 125 or may be more than about 0.6 mm.

Accordingly, the liquid crystal display module according to the second embodiment of the present invention provides each corner of the upper side of the protrusion 125 protruding from the light guide plate 110 with the curved face 124. The curved face 124 reduces friction between the hole 120 of the support main 114 and the protrusion 125 of the light guide plate 110, thereby preventing noise. Furthermore, the liquid crystal display module according to the second embodiment of the present invention prevents the generation of alien substances caused by friction between the hole 120 of the support main 114 and the protrusion 125 of the light guide plate 110.

As such, this embodiment of the present invention prevents picture quality deterioration of the liquid crystal display panel 106.

Figure 13:
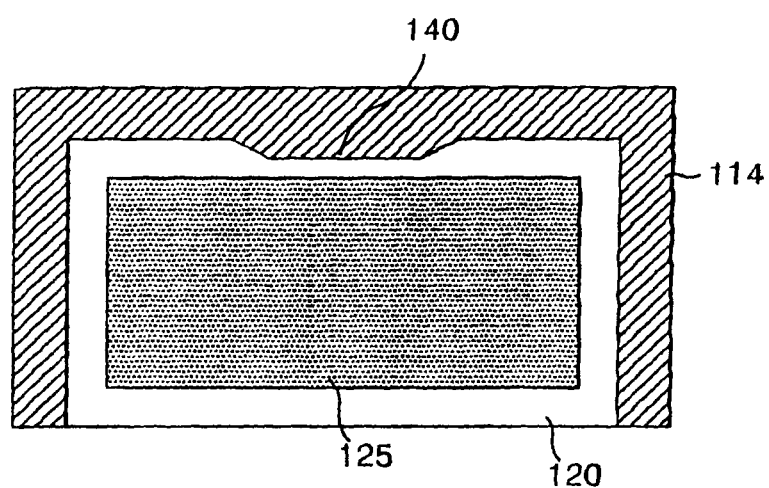
FIG. 13 is a sectional view showing an engaging part of a support main with a light guide plate in a liquid crystal display module according to a third embodiment.

Alternatively, referring to FIG. 13 and FIG. 14, a liquid crystal display module according to a third embodiment of the present invention has elements similar to those previously discussed with reference to the liquid crystal display module according to the first embodiment of the present invention. Thus, explanation regarding the elements similar to those of the first embodiment of the present invention will be omitted. Instead, reference may be made to the discussion above regarding these elements.

The support main 114 of the liquid crystal display module according to the third embodiment of the present invention includes a plurality of holes 120, and a stepped portion 140 having a trapezoidal shaped section protruding from a center of each hole 120.

Each hole 120 is formed by removing a side frame of the support main 114 in a square shape. The stepped portion 140 protrudes from each hole 120 and opposes an upper surface of the protrusion 125 of the light guide plate 110 inserted into each hole 120.

The stepped portion 140 provided at the hole 120 of the support main 114 prevents friction between the hole 120 of the support main 114 and the protrusion 125 of the light guide plate 110 when the support main 114 twists from an external force.

More specifically, when the support main 114 twists or shakes from an external force, the stepped portion 140 at the hole 120 contacts the upper surface of the protrusion 125 provided at the light guide plate 110, thereby preventing friction between the hole 120 of the support main 114 and each corner of the upper side of the protrusion 125 of the light guide plate 110.

In the liquid crystal display module according to the third embodiment of the present invention, the stepped portion 140 of the hole 120 of the support main 114 prevents friction between the hole 120 of the support main 114 and the protrusion 125 of the light guide plate 110, thereby preventing noise. Furthermore, the liquid crystal display module according to the third embodiment of the present invention prevents the generation of alien substances caused by friction between the hole 120 of the support main 114 and the protrusion 125 of the light guide plate 110. Thus, the third embodiment of the present invention prevents picture quality deterioration in the liquid crystal display panel 106.

Figure 14:
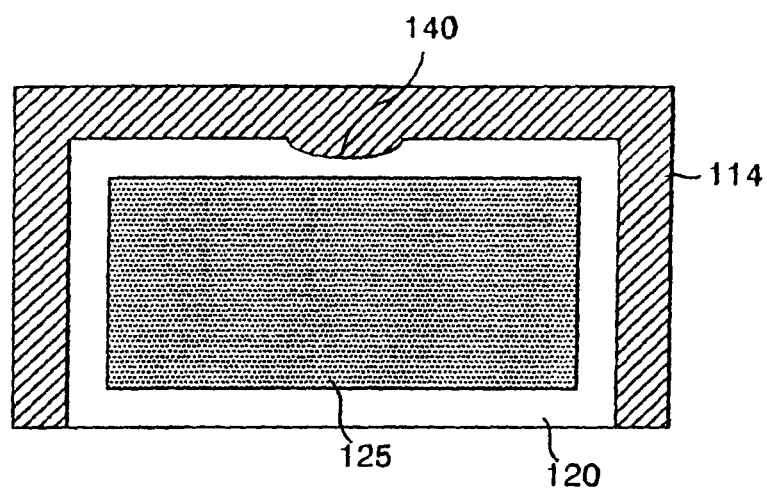
FIG. 14 is a sectional view showing an engaging part of a support main with a light guide plate in a liquid crystal display module according to a fourth embodiment.

Alternatively, the stepped portion 140 at each hole 120 of the support main 114 may have a circular shaped section as shown in FIG. 14. The circular-shaped stepped portion 140 at the hole 120 of the support main 114 prevents friction between the hole 120 of the support main 114 and the protrusion 125 of the light guide plate 110 when the support main 114 is twisted by an external force.

Figure 15:
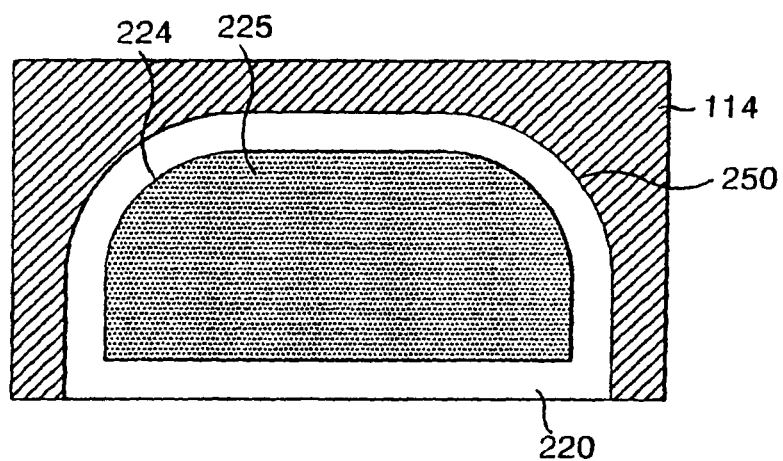
FIG. 15 is a sectional view showing an engaging part of a support main with a light guide plate in a liquid crystal display module according to a fifth embodiment.

Referring to FIG. 15, a liquid crystal display module according to a fourth embodiment of the present invention includes elements similar to the liquid crystal display module according to the first embodiment of the present invention. Therefore, an explanation with respect to elements similar to those discussed with reference to the first embodiment will be omitted.

The support main 114 of the liquid crystal display module according to the fourth embodiment of the present invention includes a plurality of holes 220 defined at the side surface of the support main 114. In this embodiment of the present invention, a configuration of a cross-section of the hole 220 has a semi-spherical shape. Each hole 220 is formed by removing the side frame of the support main 114 in a square shape and forming a rounding 250 of each upper corner of the square shape to a desired length.

The light guide plate 110 includes a plurality of protrusions 225 protruding in a semi-sphere shape such that the protrusions may be inserted into each of the holes 220 of the support main 114. Each semi-spherical protrusion 225 protrudes from the side surface of the light guide plate 110. Each protrusion 225 also has a square section and a rounding 224 at each upper corner opposed to the liquid crystal display panel. Each semi-spherical protrusion 225 is inserted into each hole 220 of the support main 114. The rounding at each upper corner of the semi-spherical protrusion 225 is spaced from each corner of the hole 220 of the support main 114 at a desired distance.

Accordingly, the liquid crystal display panel according to the fourth embodiment of the present invention has the hole 220 of the support main and the semi-spherical protrusion 225 provided at the light guide plate 110. Thus, the fourth embodiment of the present invention prevents friction between the hole 220 of the support main 114 and the semi-spherical protrusion 225 of the light guide plate 110 when an external force twists the support main 114.

More specifically, when an external force twists or shakes the support main 114, the hole 220 of the support main 114 contacts the curve face of the semi-spherical protrusion 225 provided at the light guide plate 110. When the hole 220 contacts the curve face of the semi-spherical protrusion 225, the hole 220 slides.

Accordingly, the liquid crystal display module according to the fourth embodiment of the present invention provides the support main 114 with the hole 220 and provides the light guide plate 110 with the semi-spherical protrusion 225 thereby preventing friction between the support main 114 and the light guide plate 110, and, as a result, noise. Furthermore, the liquid crystal display module according to the fourth embodiment of the present invention prevents the generation of alien substances caused by friction between the support main 114 and the light guide plate 110 thereby preventing picture quality deterioration in the liquid crystal display panel 106.

As described above, the liquid crystal display module according to the present invention provides a variety of configurations for a shape of a protrusion of a light guide plate inserted into a hole of a support main. The configurations secure a light guide plate to a support main, thereby preventing noise caused by friction between the support main and the light guide plate during twisting or shaking of the liquid crystal display module. Furthermore, the present invention prevents generation of alien substances caused by a friction between the support main and the light guide plate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display module, comprising:
a support main mounted with the liquid crystal display module;
a hole defined at the side surface of the support main, the hole having a semi-spherical shape;
a light guide plate disposed on the support main; and
a protrusion protruding from a side surface of the light guide plate to be inserted into the hole, said protrusion having a semi-spherical shape.

2. The liquid crystal display module according to claim 1, wherein a rounding at each upper corner of the semi-spherical protrusion is spaced from each corner of the hole of the support main at a desired distance.

3. A liquid crystal display module, comprising:
- a support main;
- a hole disposed within the support main, the hole having a semi-spherical shape; and
- a light guide plate disposed within the support main, the light guide plate including a protrusion, the protrusion having a semi-spherical shape wherein the protrusion is disposed within the hole.

4. The liquid crystal display module according to claim 3, wherein a rounding at each upper corner of the semi-spherical protrusion is spaced from each corner of the hole of the support main at a desired distance.

5. A liquid crystal display module, comprising:
- a support main;
- a hole defined in the support main; and
- a light guide plate, the light guide plate having a protrusion, the protrusion having a semi-spherical shape wherein the protrusion is disposed within the hole.

6. The liquid crystal display module according to claim 5, wherein the hole has a semi-spherical shape.

7. The liquid crystal display module according to claim 5, wherein a rounding at each upper corner of the semi-spherical protrusion is spaced from each corner of the hole of the support main at a desired distance.

\* \* \* \* \*